US010102056B1

(12) United States Patent
Goldberg

(10) Patent No.: US 10,102,056 B1
(45) Date of Patent: Oct. 16, 2018

(54) ANOMALY DETECTION USING MACHINE LEARNING

(71) Applicant: Amazon Technologies, Inc., Seattle, WA (US)

(72) Inventor: Anton Vladilenovich Goldberg, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 156 days.

(21) Appl. No.: 15/162,279

(22) Filed: May 23, 2016

(51) Int. Cl.
| G06F 11/00 | (2006.01) |
| G06F 11/07 | (2006.01) |
| G06N 99/00 | (2010.01) |
| G06F 9/455 | (2018.01) |

(52) U.S. Cl.
CPC ........ G06F 11/079 (2013.01); G06F 9/45558 (2013.01); G06F 11/0712 (2013.01); G06F 11/0751 (2013.01); G06F 11/0787 (2013.01); G06N 99/005 (2013.01); *G06F 2009/45587* (2013.01); *G06F 2009/45591* (2013.01)

(58) Field of Classification Search
CPC ............. G06F 11/0751; G06F 11/0754; G06F 11/079; G06F 11/327; G06F 11/3447; G06F 11/3452; G06N 99/005; G06N 3/08; G06N 3/084
See application file for complete search history.

(56) References Cited

U.S. PATENT DOCUMENTS

| 9,910,751 | B2 * | 3/2018 | McElhinney | ........... G06F 11/26 |
| 2006/0020866 | A1 * | 1/2006 | Lo | ....... G06F 11/0709 714/741 |
| 2014/0279779 | A1 * | 9/2014 | Zou | .......... G06N 3/08 706/25 |
| 2016/0147583 | A1 * | 5/2016 | Ben Simhon | ......... G06F 11/076 714/47.3 |
| 2016/0217022 | A1 * | 7/2016 | Velipasaoglu | ........ G06F 11/079 |
| 2016/0371170 | A1 * | 12/2016 | Salunke | ............. G06F 11/3612 |
| 2017/0230229 | A1 * | 8/2017 | Sasturkar | ............ H04L 41/0631 |

* cited by examiner

*Primary Examiner* — Marc Duncan
(74) *Attorney, Agent, or Firm* — Lee & Hayes, PLLC

(57) ABSTRACT

A machine learning engine is configured to create a customized anomaly detector for use by a system resource, such as a virtual machine instance running specific operations. Anomalies are determined by comparing aspects of current data to "normal" baseline data indicating a normal range of performance and operation of a system resource. Operation by a system resource that is outside of this normal range of performance and operation may be considered an anomaly. The machine learning engine may be used to create customized monitoring that detects anomalies in operation and/or performance of a system resource based on at least some custom parameters that are unique to the particular system that is to be monitored. The parameters may include operational parameters, which may be selected specifically for the system to be monitored. The parameters may also include some technical parameters which are used by many other systems to monitor hardware performance.

20 Claims, 7 Drawing Sheets

ANOMALY DETECTION USING MACHINE LEARNING

BACKGROUND

Many systems employ monitoring software that trigger alarms when the systems fail to operate within predetermined bounds. Typically, the software tracks performance of technical metrics and triggers an alarm, such as a message, a warning, or other indication, when a threshold value is reached or exceeded. The technical metrics often include hardware activity, such as processor load, memory usage, network and resource access. However, other technical metrics such as response time (latency) may be used. These metrics are often used as generic technical metrics regardless of a prescribed operation of a system. For example, a system used to control power in a hospital may include similar technical metrics as another, less critical, system used to support casual gaming via a network communication. Some systems, such as the casual gaming system, may have minimal consequence if the system fails on occasion, except the possible inconvenience of some users. However, it may not be acceptable for the system that controls power in the hospital to fail, or to fail often, since the consequences may involve human lives.

Another problem with use of technical metrics is that they often trigger many false positives, which falsely indicate that the system is not operating properly. Instead, the system may be operating properly or as-expected, but rather the system may be experiencing a larger number of requests than usual, for example. Although false positives may be acceptable for system performance, the false positives can be expensive because they often result in downstream processes that may include increased human interaction, throttling services, or reallocating other computing resources.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
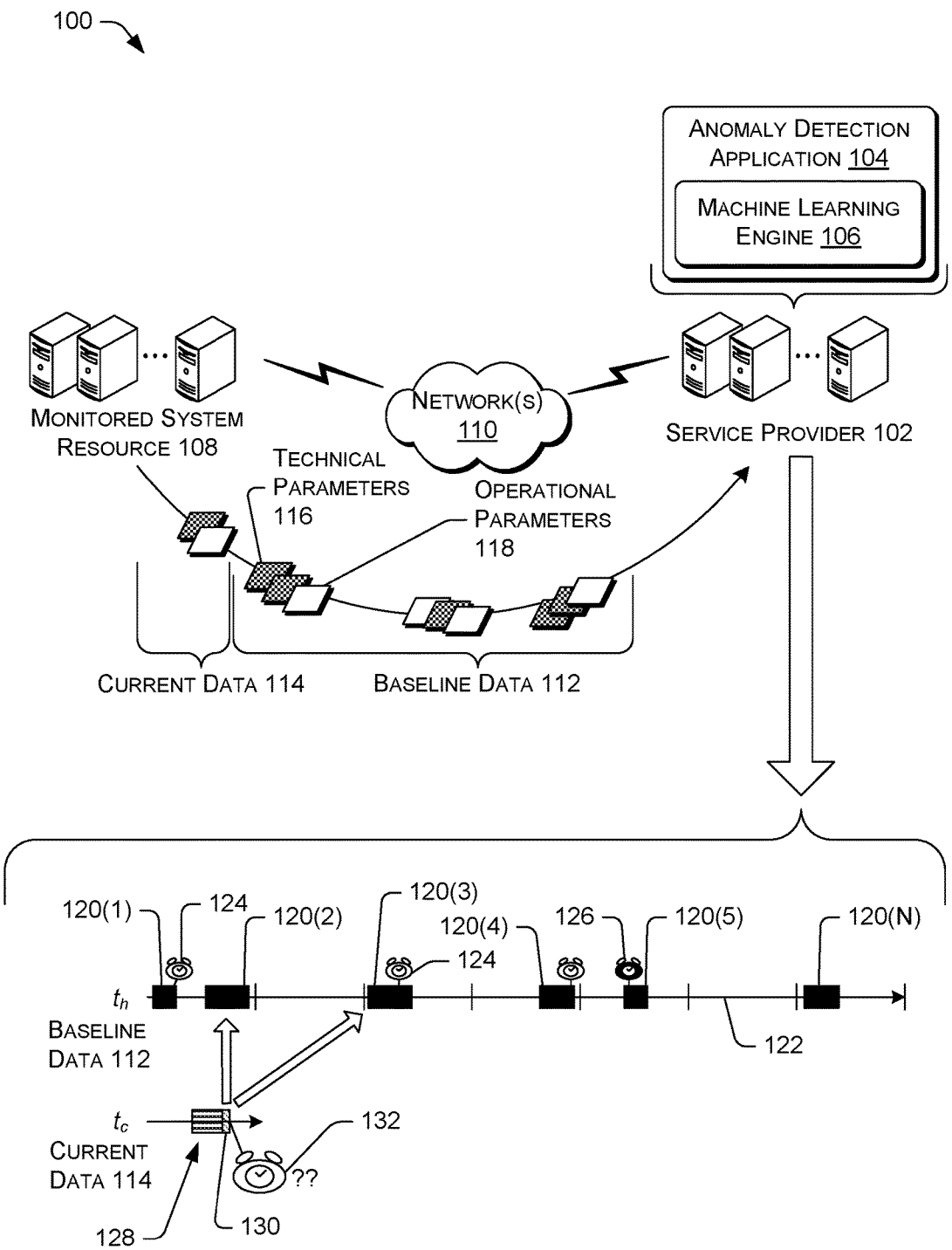
FIG. 1 is a schematic diagram of an illustrative computing environment usable to detect anomalies in system performance using machine learning.

This disclosure is directed to using a machine learning engine to enable creation of a customized anomaly detector for use by a specific type of system resource, such as a virtual machine instance running specific operations. For example, the virtual machine systems may be used to support computing of many different services, such as to host software, perform analytics, respond to user requests, and/or to support other services. Some of these services may be very different from other services. Anomalies are determined by comparing aspects of current data to "normal" baseline data. The baseline data may indicate a normal range of performance and operation of a system resource. Operation by a system resource that is outside of this normal range of performance and operation may be considered an anomaly.

The machine learning engine may be used to create customized monitoring that detects anomalies in operation and/or performance of a system resource based on at least some custom parameters that are selected for the particular system that is to be monitored. The parameters may include operational parameters, which may be selected specifically for the system to be monitored. The parameters may also include some technical parameters which are used by many other systems, such as processor load, memory usage, network and resource access, and/or response time (latency).

In some embodiments, baseline data may be selected for analysis by a machine learning engine deployed by a service provider. The baseline data may be historical data generated by a system resource. In some instances, the baseline data may be labeled as not being associated with an alarm state denoting an anomaly operation of the system resource. In various embodiments, the baseline data may be selected based on received input from a human, such as an administrator. However, the baseline data may be selected without received human input. For example, the baseline data may be selected by an algorithm based on lack of active alarms associated with the baseline data and/or other attributes of the baseline data. As explained below, other baseline data that includes alarms (e.g., valid alarms, false positive alarms, etc.) may be used for analysis and training purposes.

The machine learning engine may analyze the baseline data, and possibly other baseline data, to determine possible operational parameters that are specific to an operation of the system resource. For example, when the system resource is a virtual machine instance, an operational parameter may be a number of requests per time period from a specific source, a number of unique user requests received, a time to processes a specific operation, and so forth. These operational parameters may vary greatly based on the particular use or deployment of the virtual machine instance, or other system resource. In contrast, technical parameters may be deployed consistently over virtual machines and other systems to measure technical metrics. In some embodiments, the machine learning engine may select specific operational parameters for use in anomaly detection. However, in various embodiments, specific operation parameters may be selected based on received user input, such as input from an administrator.

The machine learning engine may determine benchmark metrics using the selected operational parameters. The benchmark metrics may indicate normal operation and may be extracted from the baseline data. In some embodiments, the baseline data may be analyzed to determine upper bounds of the "normal" data by determining minor peaks observed in data during the period of time covered by the baseline data. In some embodiments, the bounds may be based on deviations of one or more parameters over time, and thus may reflect a temporal aspect of the baseline data. The temporal aspects may also determine acceptable rates of change of parameters, such as rising rates, declining rates, and so forth. The baseline data may be analyzed and used to set one or more different bounds for the data, which may be then used to detect anomalies in operation without sole reliance on technical parameters. However, technical parameters may also be used in conjunction with the operational parameters to detect anomalies in operation and/or performance of a system resource. In some embodiments, a blended function may be deployed that uses both technical parameters and operational parameters to detect anomalies in systems. For example, the blended function may output one or more values that indicate whether or not an anomaly is present. In various embodiments, the machine learning engine may determine weights for use with different parameters which may apportion the influence of the different parameters in triggering an alarm that indicates an anomaly in operation or performance of the system.

The service provider may then analyze current data using at least the operational parameters. In some embodiments, the service provider may analyze intervals of current data using a blended function of operational parameters and technical parameters. However, some parameters may also be used individually to trigger an alarm indicating an anomaly in operation and/or performance of the system. The interval may use a rolling interval (window) or discrete intervals. The interval may be of a shorter time period than the amount of time spanned by the baseline data. In various embodiments, the machine learning engine may detect seasonality differences in data and/or other time period dependencies or trends, and may use particular baseline data that corresponds to current data in some instances.

The machine learning engine may be used to set thresholds, update the parameters, and/or cause other updates from time to time, which may maintain a high level of service for detecting anomalies of a system despite software upgrades and/or other changes to the monitored system over time.

The techniques and systems described herein may be implemented in a number of ways. Example implementations are provided below with reference to the following figures.

FIG. 1 is a schematic diagram of an illustrative computing environment 100 usable to detect anomalies in system performance using machine learning. The environment 100 includes a service provider 102. The service provider 102 employs an anomaly detection application 104 and a machine learning engine 106 to detect anomalies in performance and/or operation of a monitored system resource 108 ("system resource"). In some embodiments, the system resource 108 may be a virtual machine instance that performs a specific operation or set of tasks. One or more networks 110 may provide wired and/or wireless connectivity between the system resource 108 and the service provider 102. Although a single system resource is shown, the service provider 102 may deploy the anomaly detection application 104 and the machine learning engine 106 for many system resources, thus making the services offered by the service provider widely scalable. In some embodiments, the service provider 102 and the system resource 108 may be a same entity, and thus the monitoring may be deployed locally and possibly without use of the network(s) 110.

As shown in FIG. 1, the service provider 102 may receive data from the system resource. The data may include baseline data 112 and current data 114. The baseline data 112 may be historical data that is indicative of system performance bounds. In some embodiments, at least some baseline data may be selected that is free from association with historical alarms that indicate irregularities in performance or operation of the system resource. The historical alarms may have been based on technical parameters 116 derived from the data that are conventionally used to monitor system behavior, such as load of a processor, memory usage, and other hardware operation. The anomaly detection application 104, utilizing the machine learning engine 106, may analyze the baseline data 112 to determine operational parameters 118, which may be specific to an operation or set of tasks performed by the system resource 108. For example, the operational parameters 118 may include outcomes, activity, and/or other metrics that are specific to operation of the system resource 108, which may be used to provide a specific service (e.g., host software, facilitate communications, process data, etc.). Examples of the operational parameters 118 are provided thorough this disclosure, but may include inputs received from various sources (e.g., amount, duration, deviation), types of inputs received, types of outputs produced, amounts and frequency of outputs, and so forth. Say for example that the system resource hosts a casual video game. Example operational parameters may include parameters regarding an active and current user base (e.g., how many users are playing the game, etc.), payment metrics (e.g., are they paying, what payment instruments are used, etc.), message transmissions, early/unexpected termination of sessions, and so forth. As another example, operational parameters may track order activity, and may include orders per time period, orders by different users, orders of a given type, and so forth. In contrast, the technical parameters 116 may be aligned with performance of hardware, such as processor usage, memory allocation, network connectivity, and so forth. The technical parameters 116 and the operational parameters 118 are referred to herein as custom parameters when selected for use in association with the system resource 108 since the operational parameters 118 may be custom-selected for the system resource.

The baseline data 112, as shown in FIG. 1, may include one or more sets of data 120(1)-120(N), as depicted with respect to a timeline 122. The baseline data 112 may be associated with a period of time, as shown on the timeline 122, and may include segments of time which the data spans (minutes, hours, weeks, months, etc.). Some of the sets of data may not be associated with a historical alarm, such as the data 120(2). This data may be selected as "normal" data and used for baseline purposes. Other instances of data may be associated with a valid alarm 124 and/or a false positive alarm 126. For example, the data 120(1) may have triggered an alarm based on technical parameters reaching or exceeding bounds associated with one or more of the technical parameters. The baseline data that includes historical alarms may be used to determine weights for parameters, calibrate an anomaly detection function, and/or be used for other purposes. For example, with use of the weights and operational parameters, a detection function may be optimized by the machine learning engine 106 to minimize occurrence of false positive alarms as compared to detection that only relies solely on technical parameters, as traditionally used for such monitoring services. The baseline data 112 may be used to set bounds for the custom parameters, which may be deviations, upper/lower limits, rate of change bounds (e.g., first derivative taken numerically), and/or other bounds. The bounds may be compared to metrics derived from the current data 114 to determine whether the current data indicates anomalies in system performance and/or operation.

The current data 114 may include data 128, which may be a stream of data or a set of data. An interval 130 of the data 128 may be selected for use to populate the custom parameters, which may then be used to detect an anomaly. In some embodiments, the interval may be a rolling window and may be used to collect current values at least partly using a rolling window to update the current values. For example, when five minutes of data are included in the interval, and the parameters are updated every minute, some portions of data may be used five times in the comparison process against the bounds from the baseline data 112.

The length (time span) of the interval 130 may be less than an amount of the baseline data 112 used to set bounds for the anomaly detection. For example the baseline data 112 may span many hours of system operation whereas the data 128 may only span minutes or a portion of the amount of time spanned by the baseline data 112. Ultimately, the anomaly detection application 104 may compare current values derived from the data 128 as applied by the custom parameters to the bounds of the custom parameters derived from portions of the baseline data 112 to determine whether to signal an alarm 132 that indicates an anomaly in performance or operation of the system resource 108. In some embodiments, the comparison may include seasonality comparisons, time of day comparisons, and/or other factors which may influence which baseline data is used for setting the bounds. For example, if the current data is collected between 10:32 am and 10:37 am, then the anomaly detection application 104 may compare outputs from the custom parameters to bounds of a similar time period, but from a different day (e.g., same day in a previous week, yesterday, etc.).

Figure 2:
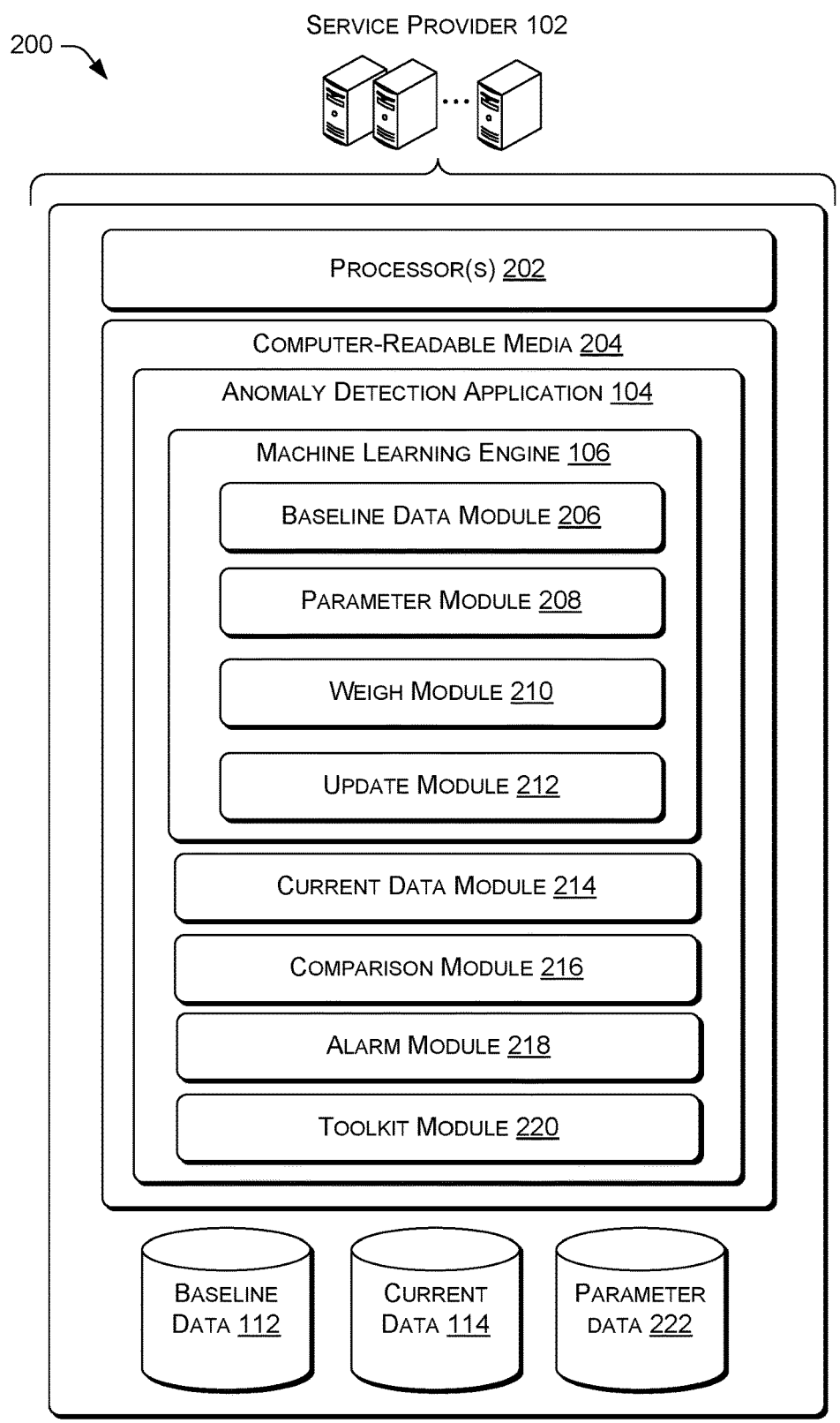
FIG. 2 is a block diagram of an illustrative computing architecture to detect anomalies in system performance using machine learning.

FIG. 2 is a block diagram of an illustrative computing architecture 200 to detect anomalies in system performance using machine learning. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the service provider 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/ machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store the anomaly detection application 104, which may include the machine learning engine 106. The machine learning engine 106 may include a baseline data module 206, a parameter module 208, a weight module 210, and an update module 212. The anomaly detection application 104 may also include a current data module 214, a comparison module 216, an alarm module 228, and a toolkit module 220. Finally, the service provider may have access to or store the baseline data 112, the current data 114, and parameter data 222. The modules, engines, and/or components may be stored together or in a distributed arrangement.

The machine learning engine 106 may be deployed through use of the various modules associated with the machine learning engine 106, as discussed below. The baseline data module 206 may be used to identify the baseline data 112, such as to determine and/or select the baseline data 112, a time frame associated with the baseline data 112, and/or an amount of the baseline data 112. In some embodiments, the machine learning engine 106 may cause automatic selection of baseline data that is free from association with any alarms triggered by technical parameters or other parameters. In some instances, the baseline data may be specified for selection from an administrator. Ultimately, the baseline data module 206 may be used to populate or otherwise mark the baseline data 112 that is used by the anomaly detection application 104.

The parameter module 208 may be used to analyze the baseline data 112 to determine custom parameters for use in monitoring a system resource. For example, the parameter module 208 may determine prominent data flows, operations, end-points, routines, and other information pertaining to operation of the system resource. In some instances, the parameters may include a temporal aspect, such as a frequency of occurrence, an amount of response or processing item, and/or other temporal aspects. In various embodiments, the parameter module 208 may determine many different candidate parameters that may be used to monitor the system resource to detect an anomaly in performance or operation. The custom parameters may then be selected from the candidate parameters based on received user input, random selection, and/or other selection techniques. In some embodiments, all the candidate parameters may be used as the custom parameters. The parameter module 208 may store the custom parameters and associated data in the parameter data 222.

The weight module 210 may generate weights to apportion an influence of the custom parameters in the detection of an anomaly. For example, some parameters may be strong indicators of an anomaly while other parameters may be weaker indicators, but still effective indicators. In some embodiments, greater weights may be applied to the indicators that are stronger indicators. In various embodiments, certain bounds by parameters, when reached, may trigger an alarm even when the collective parameters may not trigger an alarm, such as when a blended function is used to output a score associated with the custom parameters. As an example, in a system that includes payments, an operational parameter may include payments by credit card. If this parameter indicates that the quantity or frequency drops below a lower bounds (e.g., less than x occurrences in a threshold amount of time, etc.), then this may trigger an alarm even though this parameter may be associated with a weight and used in a blended function that creates a score that does not trigger the alarm. In some embodiments, the weight module 210 may use baseline data that includes a false positive alarm triggered from sole use of technical parameters when determining the weights for the custom parameters. The weight module 210 may optimize the weights to minimize false positive alarms, while triggering valid alarms based on the weights assigned to the custom parameters. The weight module 210 may store weights in association with the custom parameters and associated data in the parameter data 222. An example function is shown in Equation 1, below.

$$F(\varphi_1, \varphi_2, \varphi_3 \ldots) = \sum_i^n \omega_i \sigma(\varphi_i) \quad \text{Equ. (1)}$$

In Equation 1, $\omega$ is a weight given to a change in a primary variable $\varphi_i$, which may be expressed as a standard deviation of the variable $\varphi_i$ in the current time interval versus a corresponding baseline value.

The machine learning engine 106 and the weight module 210 may generate weights in different ways, such as by using logistic regression or a neural network. Logistic regression may be used as follows. The result of a calculation may be the probability of the service being "affected", thus a result is between 1 (100% certainty the service is affected) and 0(100% certainty the service is NOT affected). To get the result into this range a sigmoid function (1/(1+exp(-x)) may be used to convert the result (x) from its pure form into the form for logistic regression. Next, a model shown in Equation 2, below, is fit by minimizing the sum of square errors.

$$yi = \text{sig}(xi^* \text{beta}) + epsi \quad \text{Equ. (2)}$$

In this model, yi is the probability value for inputs xi, sig is the sigmoid function, beta is the vector of weights and epsi is error for case i. An optimization technique may be used to numerically find best beta values (i.e., beta corresponding to minimal sum of square errors). For example, simplex methods or variants of gradient descent may be used as the optimization technique. A training set of data representing "affected" (i.e., tickets have been cut) and "normal" states of the service is selected and then the regression is run against that set. Automated ways to selecting a training set may be employed. For example, given a set size, pick a number of discreet points with ratio between "normal" and "affected" corresponding to yearly number of outage minutes. Find "affected" data points by correlating outage tickets' timing with metrics.

A neural network may be used as follows. A neural network may be used with the number of neurons in input layer equal to the number of factors in our formula plus one and one output neuron. A few hidden layers (i.e., layers between inputs and the output) may be selected. For example, five layers may be used. The network may train using backpropagation. Each neuron may use a sigmoid function to generate an output. Each input neuron may take one of formula's factors as an input. An extra input neuron may take bias as an input. Each neuron may aggregate all its inputs using weights assigned per input and produce its output. Outputs of all neurons of a previous layer are connected to inputs of neurons of the next layer. For example, each neuron of the second (first hidden) layer may take inputs from all neurons of the input layer and send its output to each neuron of the third (second hidden) layer. Weights may be seeded using random numbers. After the network produces a result per input, errors may be calculated and optimization technique(s) may be used to generate the next generation of weights. A gradient-based solution may be used where the gradient as usual is a function of weights. Based on the gradient, the weights may be adjusted on the output neuron in such a way that decreases the errors or decreases error the most. Then using backpropagation, the process may be repeated for all the hidden layers, beginning from the last (closest to the output).

The update module 212 may update the baseline data 112, the custom parameters and/or the weights (e.g., via the parameter data 222), and/or other information, results, or data used by the anomaly detection application 104. The update module 212 may trigger updates from time to time and/or based on analysis of the baseline data or other data over time, such as to detect changes in data or data patterns, changes to software that creates the data, and/or other changes. The update module 212 may then trigger an update to the baseline data, the custom parameters, the weights, and/or other information.

The current data module 214 may access and/or monitor the current data, which may be a stream of data or a discrete set of data. The current data module may determine an interval for the current data and, using the custom parameters and/or the weights, perform analytics on the current data to create current values, a current score, and/or or other data that can be compared to thresholds and/or bounds associated with the baseline data.

The comparison module 216 may compare current values, a current score, and/or individual parameter values to bounds, thresholds, and/or other corresponding information from the baseline data to determine whether to trigger an alarm that indicates an anomaly in performance or operation of the system resource. The comparison may be based on different sets of values, such as a total score generated by a blended function that uses the weights, and/or individual values that trigger the alarm. In some embodiments, the comparison module 216 may compare rates of change of some or all of the custom parameters during a comparison. For example, a rate of change of a parameter may indicate an anomaly even though the current values do not reach or surpass an upper or lower bound for the parameter.

The alarm module 228 may cause issuance of the alarm based on an output of the comparison module 216. The alarm module 228 may transmit a message to an administrator as a result of the trigger of an alarm. In some embodiments, the alarm module 228 may cause the system resource to be throttled or provide additional computing resources for the service provider (e.g., such as when the system resource is a virtual machine instance, etc.), and thus reduce exposure to potential failures.

The toolkit module 220 may be used to set the technical parameters. The toolkit module 220 may be used to inspect the cause of an alarm, log faults and resolution activities, and/or otherwise manage the system resource in response to triggering of an alarm.

FIGS. 3-6 are flow diagrams illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
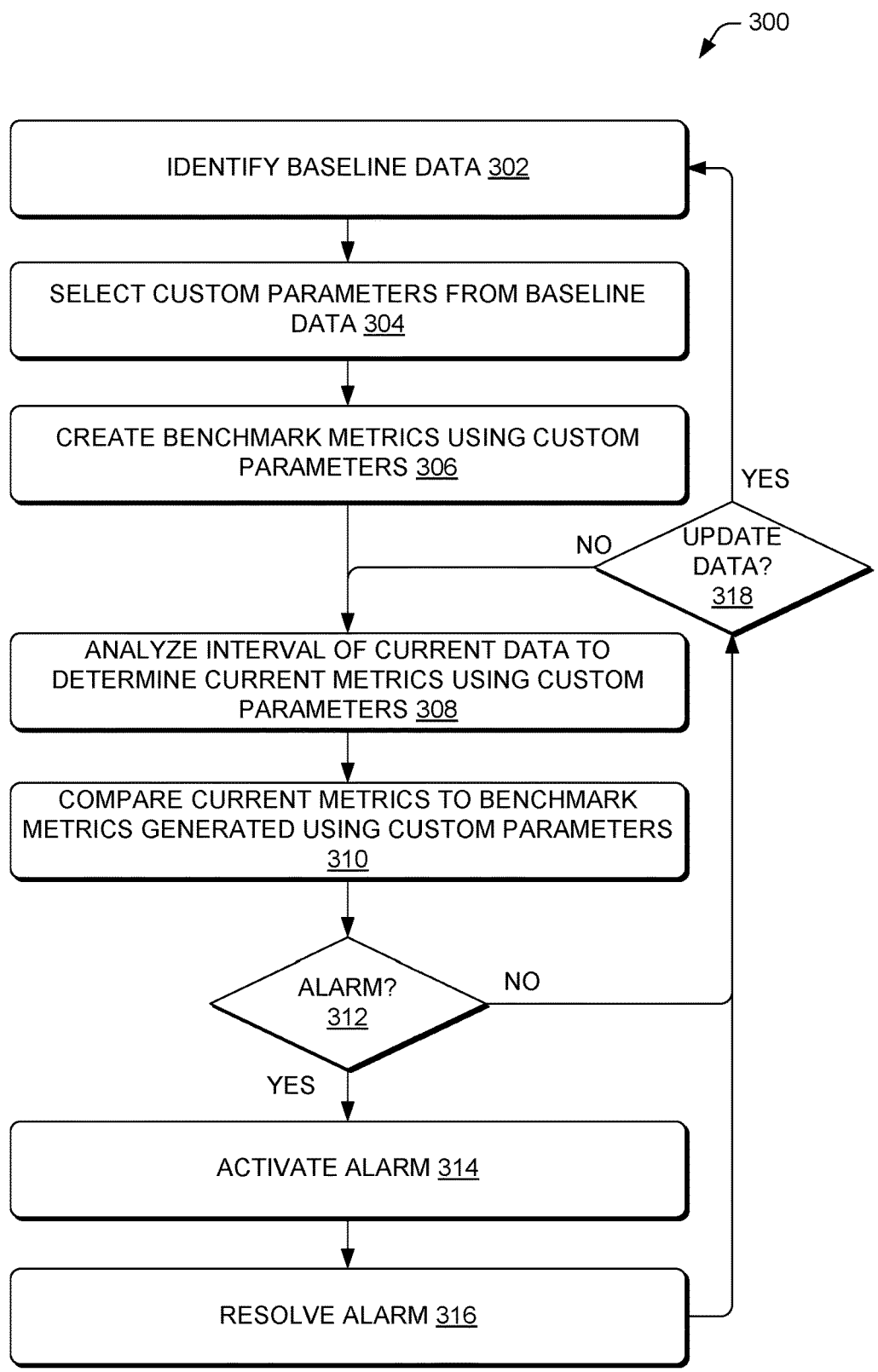
FIG. 3 is a flow diagram of an illustrative process to detect anomalies in system performance using machine learning.

FIG. 3 is a flow diagram of an illustrative process to detect anomalies in system performance using machine learning.

The process 300 is described with reference to the environment 100 and the computing architecture 200, and may be performed by the service provider 102.

At 302, the baseline data module 206 may identify baseline data. The baseline data may be used to determine custom parameters and for establishing bounds, thresholds, rates of change, and/or other metrics for parameters. In some embodiments, the baseline data may be selected automatically and without human input, such as by identifying groups of data that are not associated with alarms. In various embodiments, the baseline data may be determined by information received from an administrator. For example, an administrator may specific data to be used as the baseline data.

At 304, the parameter module 208 may analyze the baseline data to determine custom parameters. The custom parameters may include operational parameters that may be specific to services and operation performed by a system resource, such as a virtual machine instance. Thus, the operational parameters may be different for different virtual machine instances, or for different system resources that are deployed for different reasons (e.g., to support fulfilling customer requests, to host software, to analyze data, etc.). The custom parameters may also include technical parameters commonly used to monitor operation of hardware. In some embodiments, the parameter module 208 may identify candidate parameters, which may then be selected from to obtain the custom parameters. As discussed herein, the term custom parameter includes both technical parameters and operational parameters, unless stated otherwise.

At 306, the parameter module 208 may create benchmark metrics, such as bounds, thresholds, deviations, rates of changes, and/or other metrics for individual parameters of the custom parameters based on analysis of the baseline data. For example, the parameter module 208 may create upper and/or lower bounds for values of a parameter, which when observed in current data, may trigger an alarm to indicate an anomaly in performance or operation of the system resource. The benchmark metrics may also be determined for an aggregate of the custom parameters (or portion thereof), such as when the custom parameters are used to create a blended function that outputs a score. In these instances, weights may also be assigned to the individual parameters, as discussed herein.

At 308, the current data module 214 may analyze an interval of current data that is recently generated by the system resource to determine current metrics using the custom parameters. The current metrics may correspond to the benchmark metrics to enable comparison between the current metrics and the benchmark metrics. The current data module 214 may determine a length of the interval, which may be a rolling window and overlap with prior data that was analyzed or may include discrete data, such as a next set of data that has not been analyzed for indicators of an anomaly of performance or operation of the system resource.

At 310, the comparison module 216 may compare the current metrics to the benchmark metrics. The comparison may determine whether operation of the system resource is experiencing an anomaly by operating outside of the benchmark bounds, thresholds, and/or rates of change. In some instances, the comparison module 216 may determine that an aggregate score, such as a blended function may indicate that the system resource is experiencing an anomaly in performance or operation even when individual custom parameters do not generate results that would trigger an alarm individually. Thus, the aggregate, or blended function, may trigger an alarm that would otherwise not be triggered by relying on standard or traditional use of parameters, such as traditional parameters that are used to monitor hardware performance, without use of other parameters that reveal a wider view of system performance/operation.

At 312, the alarm module 218 may determine whether to trigger an alarm based on the comparison from the operation 310. For example, if the comparison determines that an aggregate score, individual metrics of custom parameters, and/or a rate of change is outside of bounds or thresholds for such metrics, the alarm module 218 may issue determine to issue an alarm. A rate of change may be determined by computing a score over a period of time to observe and measure changes in the score over the period of time. When the alarm module 218 determines to issue an alarm (following the "yes" route from the decision operation 312), then the process 300 may advance to an operation 314.

At 314, the alarm module 218 may issue an alarm to indicate a detected anomaly in performance or operation of the system resource. For example, the alarm module 216 may transmit a message to an administrator, may allocate additional computing resource to the system resource (such as in a virtual machine environment), may throttle traffic, and/or may cause performance of other tasks.

At 316, the toolkit module 220 may be used to resolve the alarm. For example, the toolkit module 220 may enable an administrator to research, analyze, and/or resolve an underlying problem that caused the alarm. The toolkit module 220 may be used to terminate or reset the alarm, or the alarm may terminate in response to production of new current data that does not trigger the alarm.

Following the operation 316, or when the alarm module 218 determines not to issue an alarm (following the "no" route from the decision operation 312), then the process 300 may advance to an operation 318 for further processing. At 318, the update module 212 may determine whether to update the baseline data, the custom parameters, and/or other data used by the process 300. The updates may be infrequent, but may be check for routinely or from time to time to ensure that the underlying data used by the service provider 102 is kept up to date. Updates may be triggered by an age of data, by a passage of time, changes to software, and/or for other reasons. When the update module 220 determines to perform an update (following the "yes" route), then the process 300 may advance to the operation 302 and continue processing as described above. When the update module 220 determines not to perform an update (following the "no" route), then the process 300 may advance to the operation 308 and continue processing as described above.

Figure 4A:
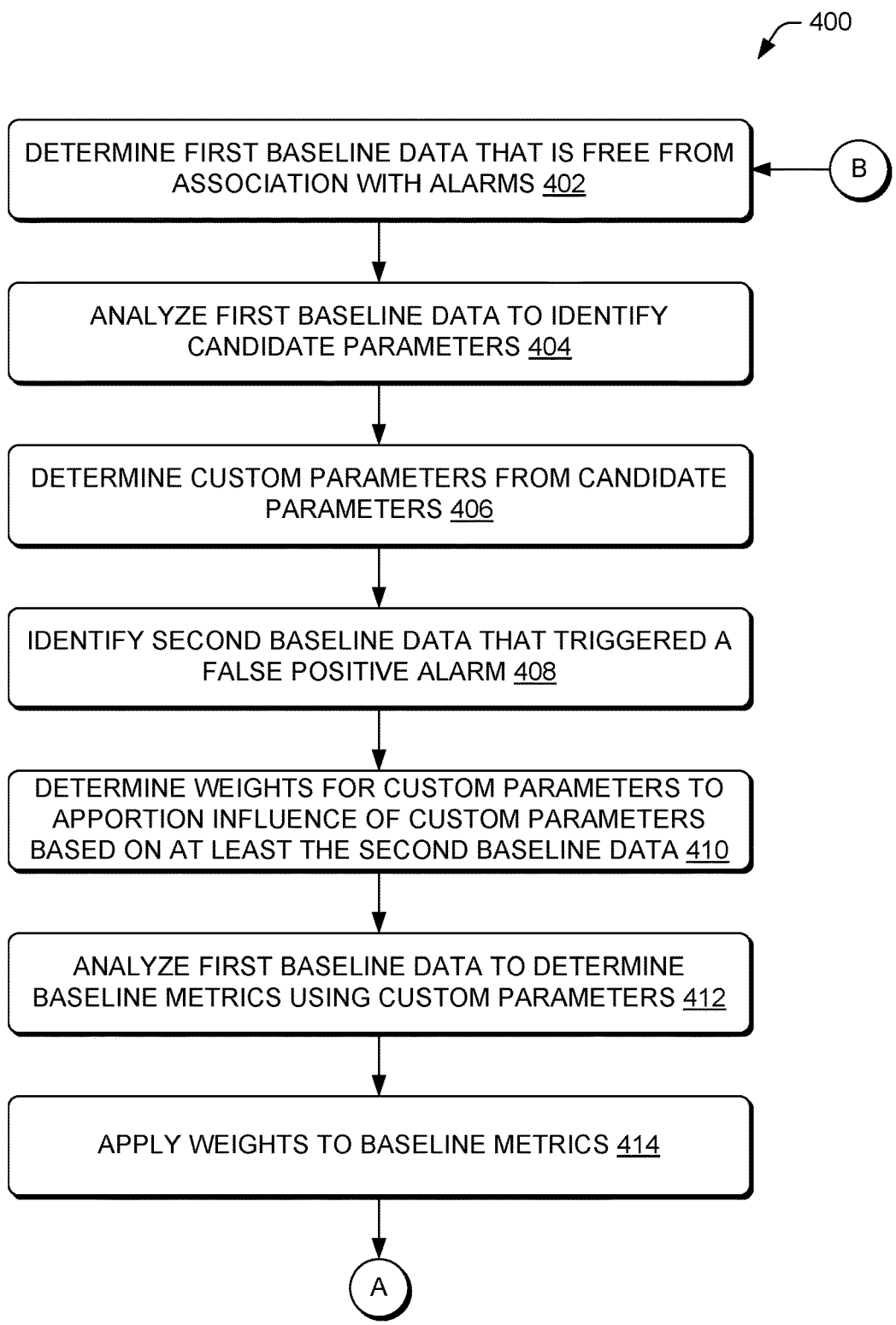
FIGS. 4A and 4B is a multi-part flow diagram of another illustrative process to detect anomalies in system performance using machine learning and weights.
Figure 4B:
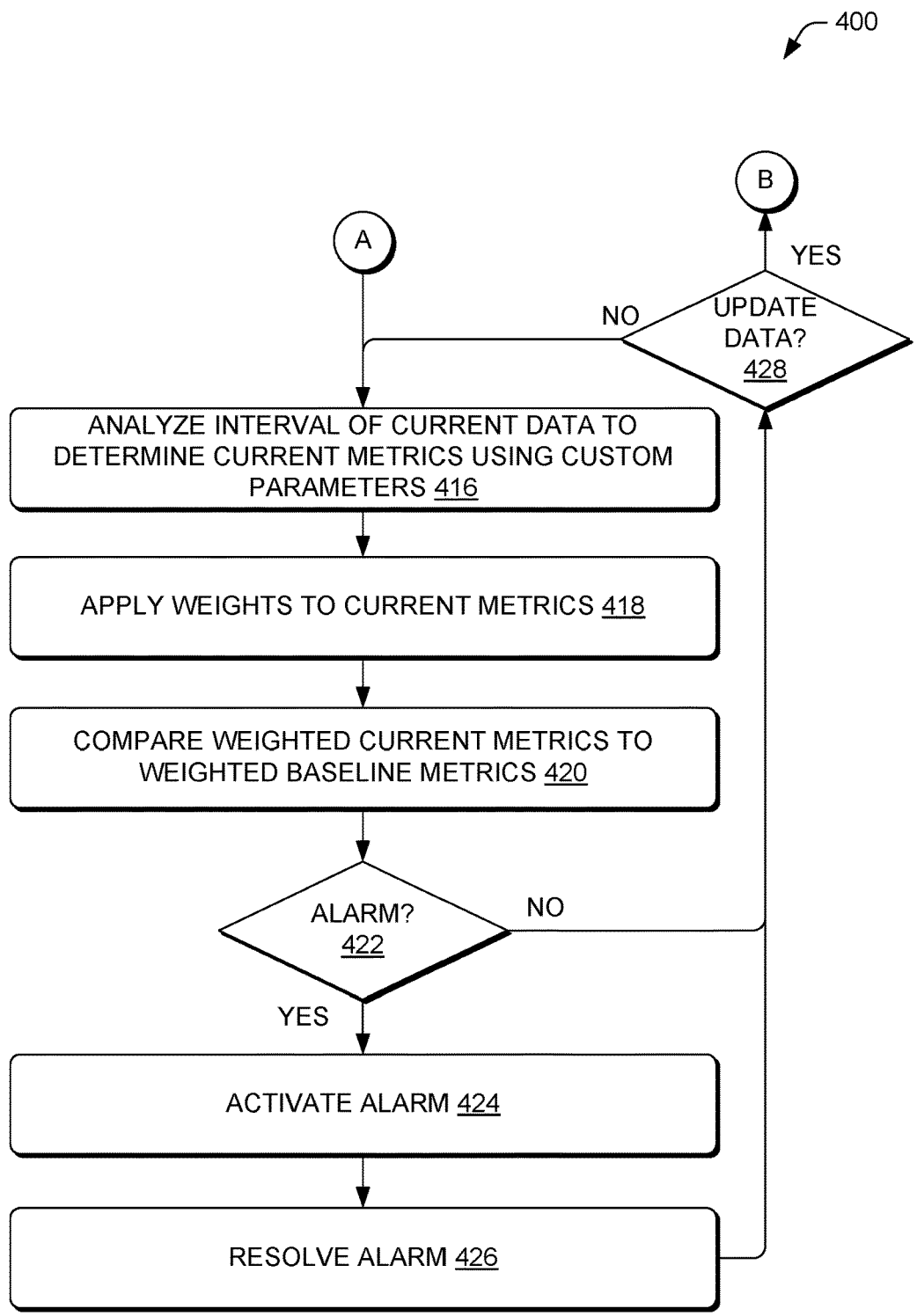

FIGS. 4A and 4B is a multi-part flow diagram of another illustrative process 400 to detect anomalies in system performance using machine learning and weights. The process 400 is described with reference to the environment 100 and the computing architecture 200, and may be performed by the service provider 102.

As shown in FIG. 4A, at 402, the baseline data module 206 may identify first baseline data that is free from association with alarms. In some embodiments, the first baseline data may be selected, such as by an administrator, as being illustrative of normal or ideal operation and performance of a system resource, and thus be used as a model for normal performance and operation. The first baseline data may be used to determine custom parameters and for establishing bounds, thresholds, rates of change, and/or other metrics for parameters.

At 404, the parameter module 208 may analyze the first baseline data to determine candidate parameters. The candidate parameters may include many operational parameters that are specific to services and operation performed by a system resource, such as a virtual machine instance. Thus, the operational parameters may be different for different virtual machine instances, or for different system resources that are deployed for different reasons.

At 406, the parameter module 208 may determine custom parameters from the candidate parameters and possibly by including technical parameters commonly used to monitor operation of hardware. In some embodiments, the custom parameters may be selected based on received user input, such as input from an administrator. As discussed herein, the term custom parameter includes both technical parameters and operational parameters, unless stated otherwise.

At 408, the baseline data module 206 may identify second baseline data that triggered a false positive alarm using technical parameters. In some embodiments, the second baseline data may be selected by an administrator. However, the second data may be selected without receiving user input, such as by searching for historical data that included an alarm, but that documents the alarm as a false positive. The second baseline data may be used to determine weights that apportion an influence of the custom parameters to minimize false positives, such that analysis of the second baseline data using the custom parameters and weights fails to trigger the false positive alarm.

At 410, the weight module 210 may employ machine learning techniques to optimize selection/determination of weights for individual custom parameters to apportion influence of the technical parameters and the operational parameters such that analysis of the second baseline data using the custom parameters and weights fails to trigger the false positive alarm, or more generally, minimizes occurrences of false positive alarms. Of course, the weight module 210 may use additional baseline data that includes additional false positive alarms to further optimize the selection/determination of the weights.

At 412, the baseline data module 206 may analyze the first baseline data to determine baseline metrics using the custom parameters. For example, the baseline data module may generate baseline values, bounds, thresholds, and/or rates of change. In some embodiments, the baseline data module 206 may determine peak values for intervals of data in the first baseline data, such as a peak rate of change, which may be used as an upper limit, a lower limit, and so forth. In other embodiments, an average value may be determined, which may be modified by a safety factor (e.g., a multiplier).

At 414, the baseline values may be modified by the weights determined at the operation 410, such as when a blended function is used to combine use of multiple custom parameters to create a single score, bounds, rate of change, or other threshold metric. This data, referred to as benchmark metrics, may be used for comparison with current values generated using similar techniques, to determine if the current data includes an anomaly in performance or operation of the system resource, as explained with reference to FIG. 4B.

As shown in FIG. 4B, at 416, the current data module 214 may analyze an interval of current data to determine current metrics using the custom parameters. The current metrics may correspond to the benchmark metrics to enable comparison between the current metrics and the benchmark metrics. The current data module 214 may determine a length of the interval, which may be a rolling window and overlap with prior data that was analyzed or may include discrete data, such as a next set of data that has not been analyzed for indicators of an anomaly of performance or operation of the system resource.

At 418, the current values may be modified by the weights determined at the operation 410, such as when a blended function is used to combine use of multiple custom parameters to create a single score, bounds, rate of change, or other threshold metric. This data, referred to as current metrics, may be used for comparison with the baseline metrics generated using similar techniques, to determine if the current data includes an anomaly in performance or operation of the system resource.

At 420, the comparison module 216 may compare the weighted current metrics to the weighted benchmark metrics. The comparison may determine whether operation of the system resource is experiencing an anomaly by operating outside of the benchmark bounds, thresholds, and/or rates of change. In some instances, the comparison module 216 may determine that an aggregate score, such as a blended function may indicate that the system resource is experiencing an anomaly in performance or operation even when individual custom parameters do not generate results that would trigger an alarm individually. Thus, the aggregate, or blended function, may trigger an alarm that would otherwise not be triggered by relying on standard or traditional use of parameters, such as traditional parameters that are used to monitor hardware performance, without use of other parameters that reveal a wider view of system performance/operation. However, the custom parameters may also be used individually or in other subsets and in comparison to other bounds, which may trigger an alarm. For example, if specific operational parameters have specific, and likely higher (or lower) bounds that indicate an anomaly without consideration of other custom parameters, then the comparison module 216 may also perform these further comparisons, when available, to trigger an alarm.

At 422, the alarm module 218 may determine whether to trigger an alarm based on the comparison(s) from the operation 420. For example, if a comparison determines that an aggregate score, individual metrics of custom parameters, and/or a rate of change is outside of bounds or thresholds for such metrics, the alarm module 218 may issue determine to issue an alarm. When the alarm module 218 determines to issue an alarm (following the "yes" route from the decision operation 422), then the process 400 may advance to an operation 424.

At 424, the alarm module 218 may issue an alarm to indicate a detected anomaly in performance or operation of the system resource. For example, the alarm module 216 may transmit a message to an administrator, may allocate additional computing resource to the system resource (such as in a virtual machine environment), may throttle traffic, and/or may cause performance of other tasks.

At 426, the toolkit module 220 may be used to resolve the alarm. For example, the toolkit module 220 may enable an administrator to research, analyze, and/or resolve an underlying problem that caused the alarm. The toolkit module 220 may be used to terminate or reset the alarm, or the alarm may terminate in response to production of new current data that does not trigger the alarm.

Following the operation 426, or when the alarm module 218 determines not to issue an alarm (following the "no" route from the decision operation 422), then the process may advance to an operation 428 for further processing. At 428, the update module 212 may determine whether to update the baseline data, the custom parameters, and/or other data used by the process 400. The updates may be infrequent, but may be check for routinely or from time to time to ensure that the underlying data used by the service provider 102 is kept up to date. Updates may be triggered by an age of data, by a passage of time, changes to software, and/or for other reasons. When the update module 220 determines to perform an update (following the "yes" route), then the process 400 may advance to the operation 402 and continue processing as described above. When the update module 220 determines not to perform an update (following the "no" route), then the process 400 may advance to the operation 416 and continue processing as described above.

Figure 5:
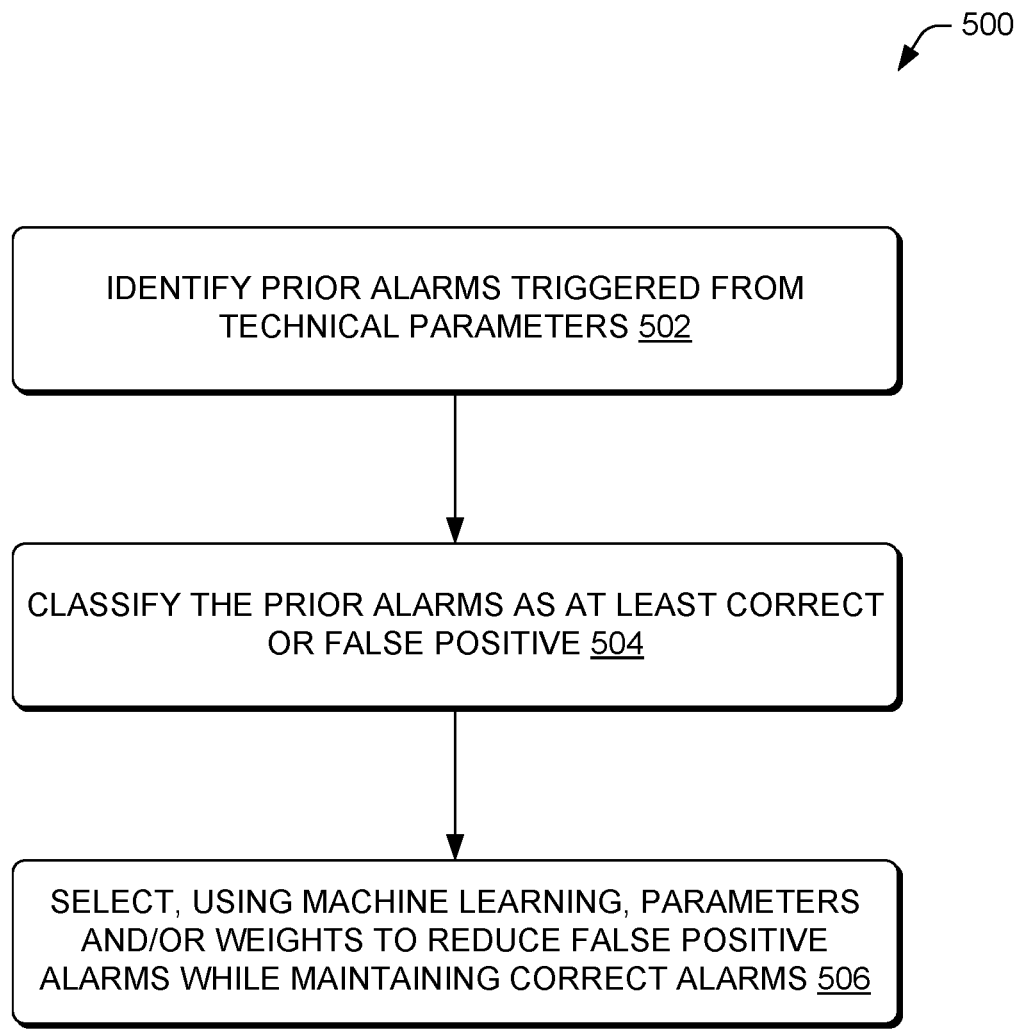
FIG. 5 is a flow diagram of an illustrative process to select parameters and/or weights to reduce at least false positive alarms by using classified data that includes known false positive alarms.

FIG. 5 is a flow diagram of an illustrative process 500 to select parameters and/or weights to reduce at least false positive alarms by using classified data that includes known false positive alarms. The process 500 is described with reference to the environment 100 and the computing architecture 200, and may be performed by the service provider 102.

At 502, the baseline data module 208 may identify prior alarms triggered solely on use of technical parameters. In some embodiments, the baseline data module 208 may identify the alarms based on a log of alarms. The log may include labels and/or descriptions of the alarms, events before and after the alarms, and/or indications of raw data that triggered the alarms.

At 504, the baseline data module 208 may classify the prior alarms as at least correct alarms or false positive alarms. In some embodiments, the classification may be received by an administrator. In various embodiments, the classification may be available from alarm resolution activity logs, which may indicate a type of alarm, a resolution, and specific metrics associated with the alarm, such as values of technical parameters, such as processor load, memory usage, connectivity, and so forth.

At 506, the machine learning engine 106, via the parameter module 208 and/or weight module 210, may select parameters and/or weights to reduce the false positive alarms present in the classified data while maintaining the correct alarms. For example, the machine learning engine 106 may access the raw data associated with a false positive alarm and then test the data using different parameters and weights. Using an iterative process or other process, the machine learning engine 106 may optimize a selection of custom parameters and possibly of weights that apportion the influence of the custom parameters at triggering correct alarms while refraining from triggering false positive alarms that were historically triggered by monitoring that relied solely on technical parameters.

Figure 6:
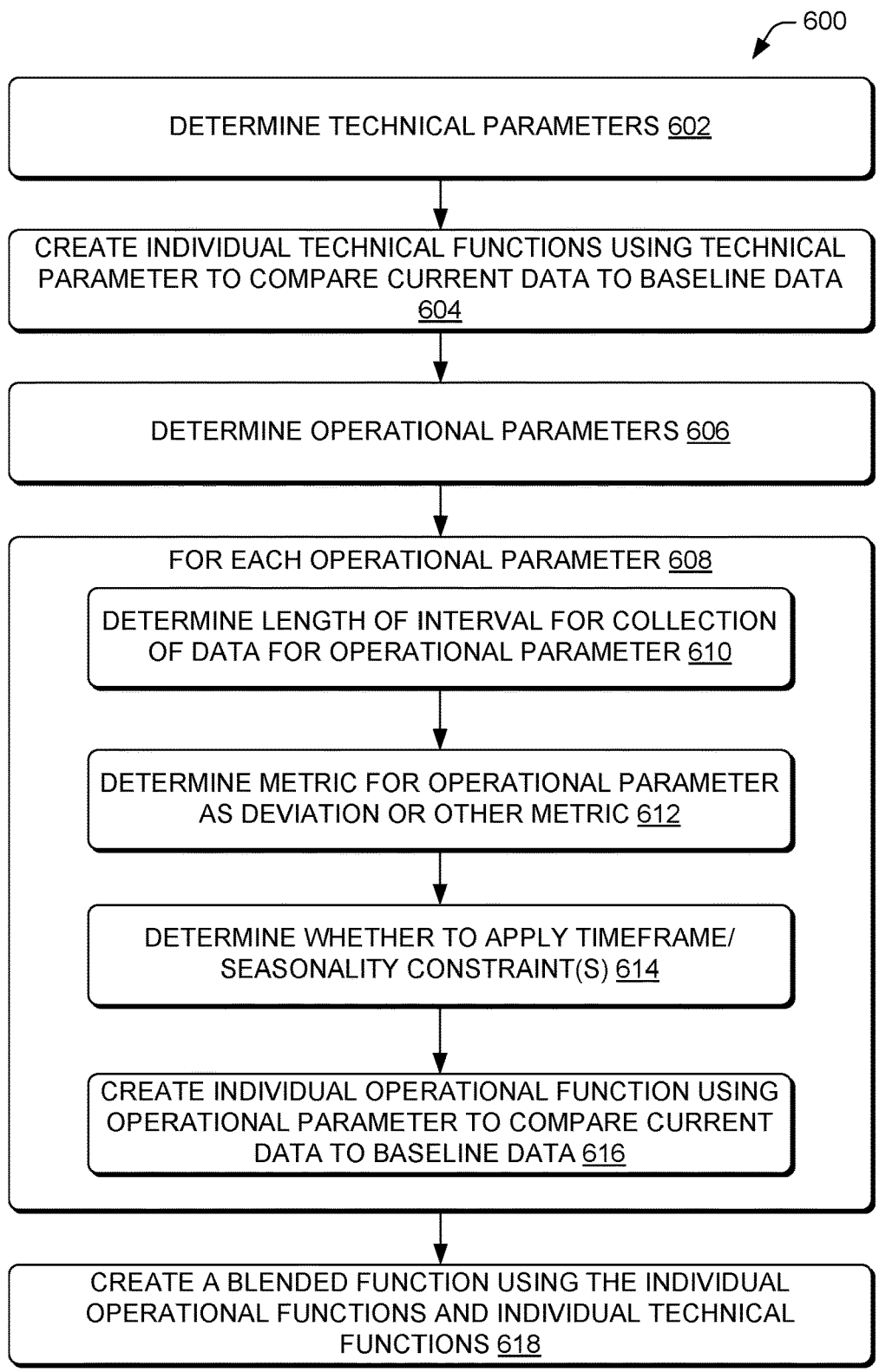
FIG. 6 is a flow diagram of an illustrative process to create technical parameters and operational parameters, which are included in a blended function that is used to detect anomalies in system performance using machine learning.

FIG. 6 is a flow diagram of an illustrative process 600 to create technical parameters and operational parameters, which are included in a blended function that is used to detect anomalies in system performance using machine learning. The process 600 is described with reference to the environment 100 and the computing architecture 200, and may be performed by the service provider 102.

At 602, the parameter module 208 may determine technical parameters. The technical parameters may be a preselected set of hardware monitoring parameters. In some embodiments, the parameter module 208 may select some, but not all, of available technical parameters, possibly in response to user input received from an administrator.

At 604, the machine learning engine 106 may create individual technical functions using the technical parameters to facilitate comparison between current data and baseline data. For example, the function may be a linear function or a linear approximation function. In various embodiments, more complex functions may be modeled to output values that indicate a priority or importance of the individual technical parameter, such as exponential functions, log based functions, or other types of functions.

At 606, the parameter module 208 may determine operational parameters. The operational parameters may be specific to services and operation performed by a system resource, such as a virtual machine instance. Thus, the operational parameters may be different for different virtual machine instances, or for different system resources that are deployed for different reasons. In some embodiments, the parameter module 208 may identify candidate parameters, which may then be selected from to obtain the operational parameters.

At 608, individual operational parameters may be processed through one or more of operations 610, 612, 614, and/or 616. At 610, a length of an interval of current data may be determined for collection of data for the individual operational parameter. For example, some operational parameters may occur relatively infrequently, and thus may require inspection or analysis of larger amounts of data (e.g., data over a greater amount of time) than what may be used for analyzing other operational parameters. In some embodiments, the interval of time from the current data may be vary based on the operational parameter being analyzed.

At 612, the individual metrics may be determined as deviations over time or as other metrics (e.g., frequency, maximum value, minimum value, rate of change, etc.). The type of metric may vary depending on the operational parameter. In some embodiments, an operation parameter may use multiple metrics, such as a rate of change, and a maximum threshold, for example.

At 614, the time frames and/or seasonality constraints, or other similar constraints may be associated with the operational parameters to enable meaningful comparisons of current data to baseline data. Thus, some operational parameters that are subject to changes or influence by time of day, seasonality, or other temporal factors may be compared with corresponding baseline data from a similar time period, but different day (e.g., a similar summer day, a morning time, etc.).

At 616, the machine learning engine 106 may create individual operational functions using the operational parameters to facilitate comparison between current data and baseline data. For example, the function may be a linear function or a linear approximation function. In various embodiments, more complex functions may be modeled to output values that indicate a priority or importance of the individual operational parameter. The functions may include or exclude some operational parameters that may not be used due to timeframe and/or seasonality constraints, or may flag these operational parameters for comparison with specific baseline data that corresponds to the timeframe, seasonality, and/or other temporal constraints.

At 618, a blended function may be created using the individual operational functions and the individual technical functions. The blended function may output one or more metrics, which may be used for comparison with one or more different sets of baseline data having baseline metrics determined with the blended function or possibly portions of the blended function. For example, if two different sets of baselined at are used, some results of functions may be compared to results from one set of baseline data while some other results of functions may be compared to results from another set of baseline data to account for time frame constraints, seasonality, or other temporal constraints. In some embodiments, outputs of the blended function may be analyzed over time to track a rate of change, which may be compared to baseline rates, for example.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system to detect anomalies in performance or operation of a virtual machine instance configured to perform a set of tasks, the system comprising:
one or more processors; and
memory storing computer-executable instructions that, when executed, cause the one or more processors to perform acts comprising:
determining first baseline data includes a first predetermined amount of historical data during a first interval;
analyzing, using a machine learning engine, the first baseline data to identify candidate parameters;
selecting at least a portion of the candidate parameters as custom parameters, wherein the custom parameters include technical parameters used across different operations and operational parameters that are unique to the set of tasks performed by the virtual machine instance;
determining second baseline data includes a second predetermined amount of the historical data during a second interval that was identified as previously triggering a false positive alarm, the false positive alarm triggered based on solely monitoring at least some of the technical parameters of the second baseline data;
determining, using the machine learning engine, weights for the custom parameters to apportion influence of the technical parameters and the operational parameters such that analysis of the second baseline data using the custom parameters and weights fails to trigger the false positive alarm;
determining, based on analysis of first baseline data using the custom parameters and weights, baseline values for the custom parameters;
determining, based on analysis of an interval of current data using the custom parameters and weights, current values for the custom parameters; and
determining, based on a comparison of the current values for the custom parameters and baseline values for the custom parameters, to signal an alarm indicating detection of an anomaly in the performance or the operation of the virtual machine instance.

2. The system as recited in claim 1, wherein determining the first baseline data further includes selecting the first predetermined amount of the historical data produced by the virtual machine instance and free from association with a historical alarm.

3. The system as recited in claim 1, wherein the interval of the current data is of a shorter duration of time than the first interval, and wherein the determining the current values is performed at least partly using a rolling window to update the current values.

4. The system as recited in claim 1, further comprising:
determining a baseline score based on the baseline values; and
determining a current score based on the current values, wherein the baseline score and the current score are determined using a blended function comprising the custom parameters, and
wherein the comparison includes comparing the baseline score to the current score, and wherein the anomaly is detected in response to the current score exceeding the baseline score by a predetermined amount.

5. The system as recited in claim 1, wherein at least some of the custom parameters are used to compare baseline deviations from the first baseline data to current deviations from the current data.

6. A method comprising:
analyzing baseline data to identify operational parameters that are unique to tasks performed by a system resource;
selecting bounds for custom parameters based at least in part on the baseline data, wherein the custom parameters include the operational parameters and technical parameters and are configured to detect anomalies in performance of the system resource, the technical parameters associated with hardware performance of the system resource;
analyzing additional baseline data to identify at least some of the technical parameters that triggered a false positive alarm within historical data, the false positive alarm triggered by monitoring the at least some of the technical parameters of the additional baseline data;
determining weights for the custom parameters to apportion the technical parameters and the operational parameters such that analysis of the additional baseline data using the custom parameters and weights fails to trigger the false positive alarm;
determining, based on analysis of an interval of current data using the custom parameters, current values for the custom parameters; and
determining, based on a comparison of the current values for the custom parameters and the bounds for the custom parameters, to signal an alarm indicating detection of an anomaly in the performance of the system resource.

7. The method as recited in claim 6, wherein the current values are determined based at least in part on the weights.

8. The method as recited in claim 6, further comprising generating a blended function that utilizes the custom parameters, the blended function configured to generate the bounds and the current values.

9. The method as recited in claim 6, wherein at least some of the custom parameters are used to compare baseline deviations in the baseline data to current deviations in the current data.

10. The method as recited in claim 6, further comprising receiving designation of the baseline data from an administrator.

11. The method as recited in claim 6, wherein the baseline data, the additional baseline data, and the interval of the current data are from at least one of (1) a same portion of a day, but from different days or (ii) a same season of a same or different year.

12. The method as recited in claim 6, wherein the interval of the current data is of a shorter duration of time than a different interval of the baseline data.

13. The method as recited in claim 6, wherein the determining the current values is performed at least partly using a rolling window to update the current values.

14. The method as recited in claim 6, wherein the comparison further includes comparing a rate of change of the current values to the bounds for the custom parameters.

15. A system resource comprising:
one or more processors; and
memory storing computer-executable instructions that, when executed, cause the one or more processors to perform acts comprising:

analyzing, using a machine learning engine, baseline data to identify operational parameters that are unique to a system resource;

selecting custom parameters based at least in part on the baseline data, wherein the custom parameters include the operational parameters and technical parameters and are configured to detect anomalies in performance of the system resource, the technical parameters associated with hardware performance of the system resource;

analyzing additional baseline data to identify at least some of the technical parameters that triggered a false positive alarm, the false positive alarm triggered by monitoring the at least some of the technical parameters of the additional baseline data;

determining, using the machine learning engine, weights for the custom parameters to apportion the technical parameters and the operational parameters such that analysis of the additional baseline data using the custom parameters and weights fails to trigger the false positive alarm;

determining, based on analysis of the baseline data using the custom parameters, baseline values for the custom parameters;

determining, based on analysis of an interval of current data using the custom parameters, current values for the custom parameters; and determining, based on a comparison of the current values for the custom parameters and the baseline values for the custom parameters, to signal an alarm indicating detection of an anomaly in the performance of the system resource.

16. The system as recited in claim 15, wherein the baseline values and the current values are determined based at least in part on the weights.

17. The system as recited in claim 15, wherein the baseline data and the interval of the current data are correlated to account for at least one of seasonality dependencies in data or time of day dependencies in the data.

18. The system as recited in claim 15, wherein the acts further comprise generating a blended function that utilizes the custom parameters, the blended function configured to generate bounds and the current values.

19. The system as recited in claim 15, wherein at least some of the custom parameters are used to compare baseline deviations in the baseline data to current deviations in the current data.

20. The system as recited in claim 15 wherein the comparison further includes comparing a rate of change of the current values to a rate of change of the baseline values.

* * * * *